Nov. 15, 1927. 1,649,558
C. M. AXHELM ET AL
DEMOUNTABLE RIM
Filed Feb. 16, 1927   2 Sheets-Sheet 2
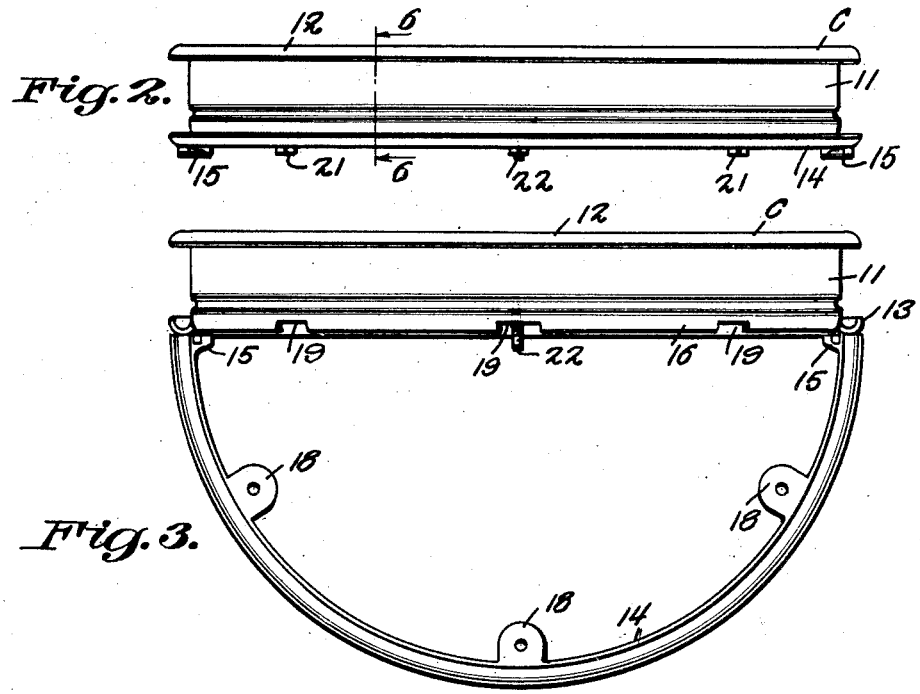
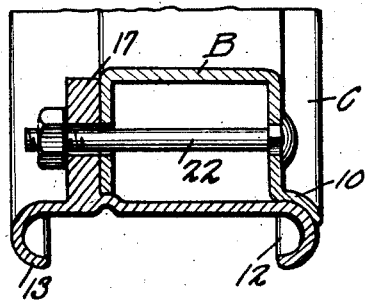
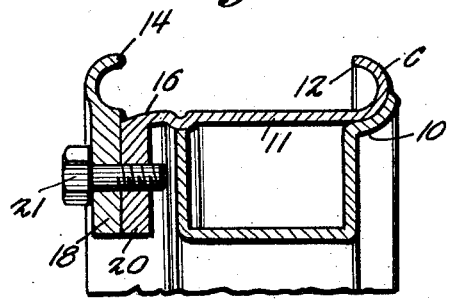
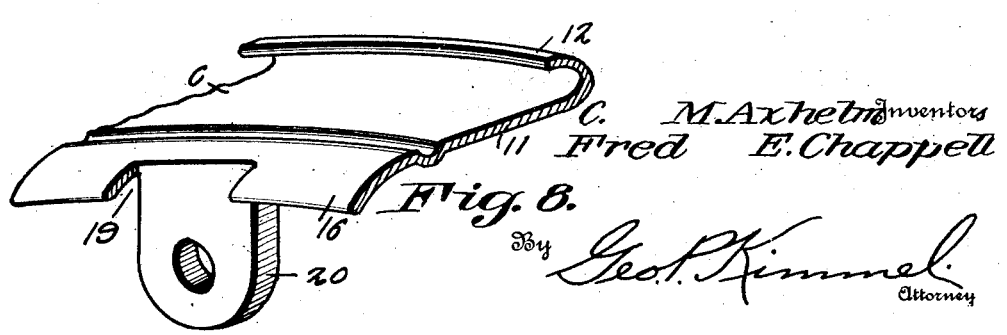
Inventors
C. M. Axhelm
Fred E. Chappell
By Geo. P. Kimmel
Attorney Patented Nov. 15, 1927.

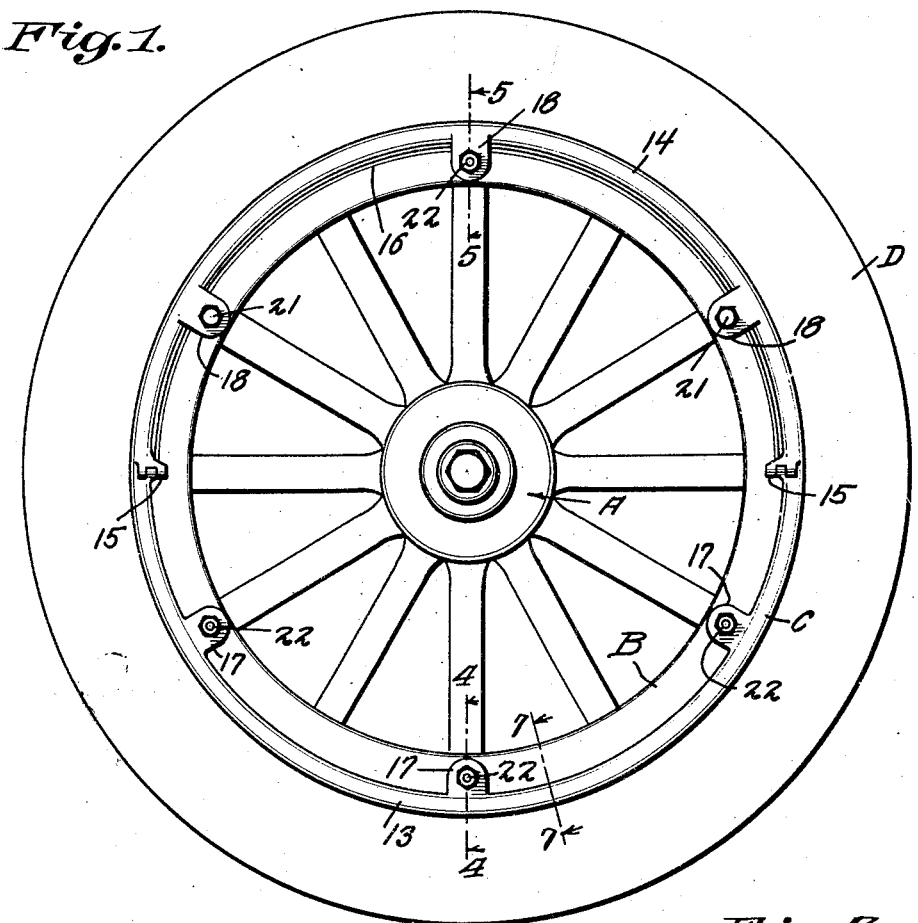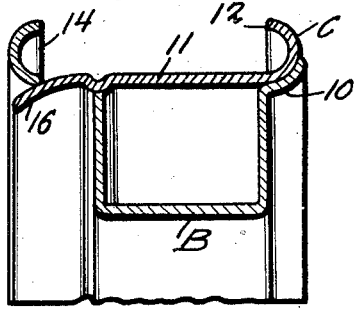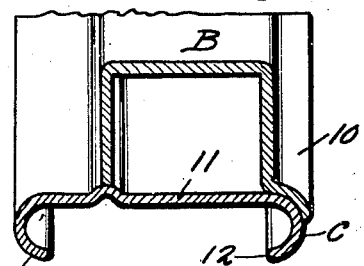

1,649,558

UNITED STATES PATENT OFFICE.

CLARENCE M. AXHELM AND FRED E. CHAPPELL, OF OMAHA, NEBRASKA; SAID CHAPPELL ASSIGNOR TO SAID AXHELM.

DEMOUNTABLE RIM.

Application filed February 16, 1927. Serial No. 168,779.

The invention relates to a wheel rim, more especially to the class of demountable rims for automobile wheels or the like.

The primary object of the invention is the provision of a rim of this character, in a manner as hereinafter set forth, wherein the casing or shoe of a pneumatic tire can be conveniently and easily mounted upon the rim, without exertion or excessive labor on the part of a person, either when required to demount the casing or shoe from the rim or mount the same thereon.

Another object of the invention is the provision of a flanged rim, in a manner as hereinafter set forth, wherein a segment of the flange of said rim at one side thereof can be shifted to a position to permit a tire to be readily and conveniently placed upon the rim or removed therefrom, and further wherein the rim is provided with means acting, when the tire is upon the rim, to firmly and securely clamp it without liability of its creeping thereon circumferentially of the rim or of lateral displacement to either side of the same.

A still further object of the invention is the provision of a rim of this character, wherein the construction thereof permits its use as a tire carrier when demounted from a wheel and materially simplifies the application and removal of a tire on and from the same.

A still further object of the invention is the provision of a rim of this character, which is comparatively simple in construction, thoroughly reliable and efficient in its purpose, strong, durable, and inexpensive to manufacture.

With these and other objects in view, the invention consists in the features of construction, combination and arrangement of parts, as will be hereinafter more fully described in detail, illustrated in the accompanying drawings, showing the preferred embodiments of the invention, and pointed out in the claims hereunto appended.

In the accompanying drawings:

Figure 1 is a side elevation of a vehicle wheel showing the demountable rim constructed in accordance with the invention applied and supporting a tire.

Figure 2 is a top plan view of the rim showing the tire removed with the displaceable clincher flange in position for clamping the tire upon the rim.

Figure 3 is a view similar to Figure 2 showing the displaceable clincher flanger swung to position for the mounting of a tire or the demounting thereof on and from the rim.

Figure 4 is a sectional view on the line 4—4 of Figure 1 looking in the direction of the arrows.

Figure 5 is a sectional view on the line 5—5 of Figure 1 looking in the direction of the arrows.

Figure 6 is a fragmentary sectional view taken approximately on the line 6—6 of Figure 2 looking in the direction of the arrows.

Figure 7 is a sectional view on the line 7—7 of Figure 1.

Figure 8 is a fragmentary detailed perspective view of a portion of the rim at the point of the displaceable clincher flanged section.

Similar reference characters indicate corresponding parts throughout the several views in the drawings.

Referring to the drawings in detail A designates generally a vehicle wheel of the automobile type, B the felloe thereof, C the demountable rim carried upon the felloe and D the pneumatic tire upon said rim. The wheel A and its felloe B are of conventional form, the latter being of the stamped metal type and having at the inner side of the wheel, the usual circumferentially disposed outwardly curved abutment lip 10, for the demountable rim C, when engaged upon the felloe B, as will be clearly apparent in Figures 4 to 7 inclusive of the drawings.

The rim C comprises a comparatively relatively wide unbroken annular body or band 11, having at its inner edge an outwardly and inwardly curved inside clincher flange 12, disposed circumferentially of said rim and continuous throughout the body or band 11. This flange 12 is designed to abut the circumferential lip 10 on the felloe, when the demountable rim C is engaged upon the wheel, as is usual or customary.

Formed throughout one half of the circumference of the demountable rim C and integral with the body or band 11 thereof at the outside and opposite the flange 12, is a companion clincher flange 13, which in its confronting relation to the inside clincher flange 12, will cooperate to fasten the casing or shoe of the pneumatic tire D upon the rim C in the usual well known manner.

Extending throughout the other half of the circumference of the rim C at the outside thereof is a shiftable clincher flanged section 14, connected at its ends with the flanged section 13, through the medium of suitable hinges 15, so that the section 14 can be swung upwardly and inwardly onto the band 11 or outwardly and downwardly to the position as shown in Figure 3 of the drawings. When the section 14 has been opened or swung to the position as shown in Figure 3 of the drawings, the tire D can be readily and easily mounted upon the rim C without exertion and with dispatch.

The body or band 11 is formed with an inwardly curved lip or ledge 16 to oppose the flange section 13 and further said lip or ledge is adapted to ride the inner periphery of the casing or shoe of the tire D to guide the same when being mounted upon the rim C, and to facilitate such mounting upon said rim, the lip or ledge 16 being clearly illustrated in Figures 3, 6 and 8 of the drawings.

Integral with the flanged section 13 are spaced lugs 17. Integral with the flanged section 14 are spaced lugs 18. The lip or ledge 16 is provided with spaced notches 19 to receive the lugs 18. The lip or ledge 16 is provided with spaced lugs 20 and which are connected to the lugs 18 by holdfast devices 21. Bolt members 22 are provided for securing the lugs 17 against the body or band B. With reference to Figure 5 the lugs 18 and 20 are shown connected together by the holdfast devices 21 and with reference to Figure 4 the lugs 17 are shown secured to the body B by the holdfast devices or bolt members 22.

The rim C is demountably engaged on the felloe B of the wheel A in the customary or usual manner and on the demounting of the rim C the latter can be utilized as a tire carrier employed in the customary manner.

When it is desired to mount the tire D upon the rim C, it is only necessary to remove the bolts or fastenings 21 from engagement with the lugs 18 and 20, thereby freeing the section 14 and on the swinging of the same upwardly and downwardly as is shown in Figure 3 of the drawings, the tire D can be readily slipped upon the rim C for the mounting of said tire thereon. Thereafter the section 14 is closed relative to the rim C and the bolts 21 engaged in a manner as hereinbefore described, so that the tire D will be clamped upon the rim. The demounting of the rim C from the felloe B of the wheel A will be obvious.

From the foregoing it is thought that the construction and manner of operation of the device will be clearly understood and therefore a more extended explanation has been omitted.

What is claimed is:—

1. A rim comprising an annular rim body having its inner side provided with an endless concentric flange and its outer side provided with a flange and a lip, said flange on the outer side of the rim body extending a portion of the circumference thereof, said lip extending the remaining portion of the circumference of said body, an outwardly and an inwardly movable flange section co-extensive with said lip and adapted to seat on the latter when swung inwardly thereby forming a continuation of said outer flange, means for hinging said section to said outer flange, means for detachably connecting the rim body to a felloe, said lip formed with spaced notches and inwardly extending lugs, each lug arranged at the base of a notch, inwardly extending spaced lugs on said section to fit into said notches to oppose the lugs on the lip when said section is seated on the lip, and means for detachably connecting said opposed lugs together to maintain said section in seated position.

2. A rim comprising an annular rim body having its inner side provided with an endless concentric flange and its outer side provided with a flange and a lip, said flange on the outer side of said rim body extending a portion of the circumference thereof, said lip extending the remaining portion of the circumference of said rim body, and outwardly and inwardly movable flange section co-extensive with said lip and adapted to seat on the latter when swung inwardly to form a continuation of said outer flange, means for hinging said section to said outer flange, means for detachably connecting the rim body to a felloe, said lip formed with spaced notches and inwardly extending lugs, each lug positioned at the base of a notch, inwardly extending spaced lugs on said section for positioning in said notches to oppose the lugs on the lip when said section is seated on the lip, said lugs on said lip being apertured and having the walls of the apertures thereof threaded, said lugs on said section being apertured, and means extending through the apertures of said opposed lugs and threadedly engaging with the lugs on the lip for maintaining said section in seated position.

In testimony whereof, we affix our signatures hereto.

CLARENCE M. AXHELM.
FRED E. CHAPPELL.